United States Patent
Liu et al.

(10) Patent No.: US 10,627,806 B2
(45) Date of Patent: Apr. 21, 2020

(54) SERVO CONTROL SYSTEM AND ROBOT

(71) Applicant: UBTECH Robotics Corp., Shenzhen (CN)

(72) Inventors: Dong Liu, Shenzhen (CN); Youjun Xiong, Shenzhen (CN)

(73) Assignee: UBTECH ROBOTICS CORP., Shenzhen (CN)

(*) Notice: Subject to any disclaimer, the term of this patent is extended or adjusted under 35 U.S.C. 154(b) by 528 days.

(21) Appl. No.: 15/321,725

(22) PCT Filed: Oct. 28, 2016

(86) PCT No.: PCT/CN2016/103829
§ 371 (c)(1),
(2) Date: Dec. 22, 2016

(87) PCT Pub. No.: WO2018/076296
PCT Pub. Date: May 3, 2018

(65) Prior Publication Data
US 2018/0259940 A1    Sep. 13, 2018

(51) Int. Cl.
*H02K 11/21* (2016.01)
*H02K 7/09* (2006.01)
*H02P 5/50* (2016.01)
*G05B 19/414* (2006.01)
*G05B 19/042* (2006.01)

(52) U.S. Cl.
CPC ......... *G05B 19/414* (2013.01); *G05B 19/042* (2013.01); *G05B 2219/34013* (2013.01); *G05B 2219/37429* (2013.01)

(58) Field of Classification Search
CPC .................................. H02P 6/18; H02P 5/56
See application file for complete search history.

(56) References Cited

U.S. PATENT DOCUMENTS

| 6,986,688 B1* | 1/2006 | Jansen ............ B63H 20/007 440/1 |
| 2010/0225309 A1* | 9/2010 | Takahashi ............ G01D 5/145 324/207.25 |
| 2011/0025312 A1* | 2/2011 | Nagano ............ G01D 5/145 324/207.25 |

(Continued)

FOREIGN PATENT DOCUMENTS

CN    104991442 A    10/2015

OTHER PUBLICATIONS

ISR for PCT/CN2016/103829
Written opinions of ISA for PCT/CN2016/103829.

*Primary Examiner* — Jorge L Carrasquillo
*Assistant Examiner* — Charles S Laughlin

(57) ABSTRACT

The present invention provides a servo control system and a robot. The servo control system is applied to a servo, and includes a main control module including an angle information receiving terminal and a detection control terminal; and an angle collection module including a magnet and a magnetic encoding chip spaced apart from the magnet by a certain distance. The magnet is connected to a rotation output shaft of the servo. The magnetic encoding chip includes an angle information output terminal and a detection control receiving terminal. In the above manner, the present invention can accurately acquire position information of a servo.

17 Claims, 8 Drawing Sheets

(56) References Cited

U.S. PATENT DOCUMENTS

| | | | |
|---|---|---|---|
| 2015/0168929 A1* | 6/2015 | Saegusa | G05B 19/414 700/19 |
| 2016/0138942 A1* | 5/2016 | Takahashi | G01D 5/2449 324/207.12 |
| 2018/0100889 A1* | 4/2018 | Swamy | G01R 31/42 |

* cited by examiner

SERVO CONTROL SYSTEM AND ROBOT

BACKGROUND

1. Technical Field

The present disclosure relates to automation control technology, and particularly to a servo control system and a robot.

2. Description of Related Art

With the advancement of technology, robotic technology has been greatly developed and been gradually into people's daily lives. In robotic technology, servos are important assemblies of a robot. A servo control system is an important component of a servo and controls each servo of a robot to perform various operations.

In the existing servo control systems, potentiometers are used to collect the information of current position of motors in servos. When servos have operated for a long time, potentiometers will be worn, thereby causing the collected data to have a big error, which results in the phenomena of inaccurate positioning of the servos.

SUMMARY

In view of this, the present invention provides a servo control system and a robot that can accurately acquire position information of servos.

The present invention provides a servo control system applied to a servo. The servo control system includes a main control module including an angle information receiving terminal and a detection control terminal; and an angle collection module including a magnet and a magnetic encoding chip spaced apart from the magnet by a certain distance. The magnet is connected to a rotation output shaft of the servo. The magnetic encoding chip includes an angle information output terminal and a detection control receiving terminal. The angle information output terminal is coupled to the angle information receiving terminal of the main control module, and the detection control receiving terminal is coupled to the detection control terminal of the main control module. When rotating, the rotation output shaft drives the magnet to rotate. The main control module controls, via the detection control terminal and the detection control receiving terminal, the magnetic encoding chip to sense information of changing magnetic field generated when the magnet rotates. The magnetic encoding chip senses information of rotation angle of the rotation output shaft of the servo according to the information of changing magnetic field. The main control module receives, via the angle information output terminal and the angle information receiving terminal, the information of rotation angle of the rotation output shaft, and controls rotation of the servo according to the information of angle.

Wherein, the main control module further includes an angle information feedback terminal. The magnetic encoding chip includes a feedback receiving terminal coupled to the angle information feedback terminal. The main control module outputs, via the angle information, feedback, terminal and the feedback receiving terminal, angle feedback information to the magnetic encoding chip, and determines whether or not the information of angle is within a preset range.

Wherein, the magnetic encoding chip includes a magnetic sensing circuit and a position acquiring unit. The magnetic sensing circuit is arranged in induced magnetic Held of the magnet and electrically coupled to the position acquiring unit. The position acquiring unit is respectively electrically coupled to, via the angle information output terminal and the detection control receiving terminal, the angle information receiving terminal and the detection control terminal.

Wherein, the servo control system further includes a driving module configured to receive a control signal transmitted from the main control module and output a driving pulse signal according to the control signal to drive an electric motor arranged in the servo to rotate.

Wherein, the servo control system further includes a filter circuit. The fitter circuit is coupled between the driving module and the electric motor, and configured to perform a filtering process to the driving pulse signal.

Wherein, the driving module is further configured to detect a current operating current of the electric motor and feedback the current operating current of the electric motor to the main control module, and the main control module adjusts a waveform of the driving pulse signal according to the current operating current of the electric motor.

Wherein, the servo control system further includes a power supply module and a charge detection module coupled to the main control module. The power supply module is configured to provide a power supply for the servo, and the charge detection module is configured to detect a charge of a battery inside the servo.

Wherein, the servo control system further includes a communication module coupled to the main control module. The communication module is configured to communicate with a servo of upper level and/or a servo of lower level, receives an identification number, or an identification number together with an action instruction information of the servo of upper level, or transmit an identification number, or an identification number together with an action instruction information of the servo of lower level.

Wherein, the servo control system further includes a temperature collection module coupled to the main control module. The temperature collection module is configured to collect a temperature of the electric motor. If the collected temperature of the electric motor is greater than a preset threshold value, the main control module controls the electric motor to stop rotating, or reduces a rotation speed of the electric motor.

The present invention further provides a robot including a central processor and a plurality of servos coupled to the central processor. Each servo includes a servo control system. The servo control system includes a main control module including an angle information receiving terminal and a detection control terminal; and an angle collection module including a magnet and a magnetic encoding chip spaced apart from the magnet by a certain distance. The magnet is connected to a rotation output shaft of the servo. The magnetic encoding chip includes an angle information output terminal and a detection control receiving terminal. The angle information output terminal is coupled to the angle information receiving terminal of the main control module, and the detection control receiving terminal is coupled to the detection control terminal of the main control module. When rotating, the rotation output shaft drives the magnet to rotate. The main control module controls, via the detection control terminal and the detection control receiving terminal, the magnetic encoding chip to sense information of changing magnetic field generated when the magnet rotates. The magnetic encoding chip senses information of rotation angle of the rotation output shaft of the servo according to the information of changing magnetic field. The main control module receives, via the angle information output terminal and the angle information receiving terminal, the information of rotation angle of the rotation output shaft, and controls rotation of the servo according to the information of angle.

Wherein, the main control module further includes an angle information feedback terminal. The magnetic encoding chip includes a feedback receiving terminal coupled to the angle information feedback terminal. The main control module outputs, via the angle information feedback terminal and the feedback receiving terminal angle feedback information to the magnetic encoding chip, and determines whether or not the information of angle is within a preset range.

Wherein, the magnetic encoding chip includes a magnetic sensing circuit and a position acquiring unit. The magnetic sensing circuit is arranged in induced magnetic field of the magnet and electrically coupled to the position acquiring unit. The position acquiring unit is respectively electrically coupled to, via the angle information output terminal and the detection control receiving terminal, the angle information receiving terminal and the detection control terminal.

Wherein, the servo control system further includes a driving module configured to receive a control signal transmitted from the main control module and output a driving pulse signal according to the control signal to drive an electric motor arranged in the servo to rotate.

Wherein, the servo control system further includes a filter circuit. The filter circuit is coupled between the driving module and the electric motor, and configured to perform a filtering process to the driving pulse signal.

Wherein, the driving module is further configured to detect a current operating current of the electric motor and feedback the current operating current of the electric motor to the main control module, and the main control module adjusts a waveform of the driving pulse signal according to the current operating current of the electric motor.

Wherein, the servo control system further includes a power supply module and a charge detection module coupled to the main control module. The power supply module is configured to provide a power supply for the servo, and the charge detection module is configured to detect a charge of a battery inside the servo.

Wherein, the servo control system further includes a communication module coupled to the main control module. The communication module is configured to communicate with a servo of upper level and/or a servo of lower level, receives an identification number, or an identification number together with an action instruction information of the servo of upper level, or transmit an identification number, or an identification number together with an action instruction information of the servo of lower level.

Wherein, the servo control system further includes a temperature collection module coupled to the main control module. The temperature collection module is configured to collect a temperature of the electric motor. If the collected temperature of the electric motor is greater than a preset threshold value, the main control module controls the electric motor to stop rotating, or reduces a rotation speed of the electric motor.

With the aforementioned technical solutions, the beneficial effects of the present invention are: In the servo control system of the present invention, when rotating, the rotation output shaft drives the magnet to rotate. The main control module controls, via the detection control terminal and the detection control receiving terminal, the magnetic encoding chip to sense information of changing magnetic field generated when the magnet rotates. The magnetic encoding chip senses information of rotation angle of the rotation output shaft of the servo according to the information of changing magnetic field. The main control module receives, via the angle information output terminal and the angle information receiving terminal, the information of rotation angle of the rotation output shaft, and controls rotation of the servo according to the information of angle, which can accurately acquire position information of a servo.

BRIEF DESCRIPTION OF THE DRAWINGS

In order to more clearly describe the technical solution(s) of the embodiment(s) of the present invention, the drawings used in the descriptions of the embodiment(s) will be briefly introduced. Obviously, the following described drawings are merely some embodiments of the present invention. To those skilled in the art, other drawings may be obtained according to these drawings without creative work.

DETAILED DESCRIPTION

The technical, solutions of the embodiments) of the present invention will be clearly and completely described in conjunction with the drawings of the embodiment(s) of the present invention. Obviously, the described embodiment(s) is only a part of embodiments of the present invention, but not all the embodiments. Based on the embodiment(s) of the present invention, all other embodiments obtained by those skilled in the art without creative work are all within the protection scope of the present invention.

Figure 1:
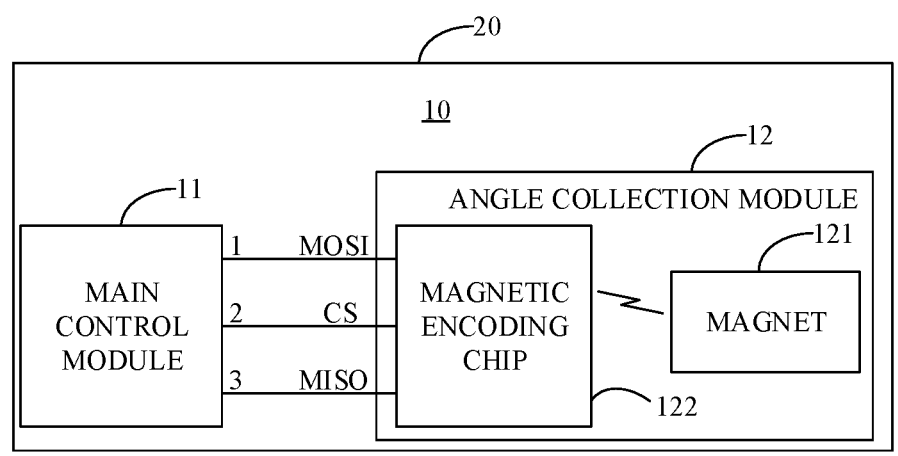
FIG. 1 is a schematic block diagram of a servo control system of a preferred embodiment of the present invention being applied to a servo.

FIG. 1 is a schematic block diagram of a servo control system 10 of a preferred embodiment of the present invention being applied to a servo 20. The servo control system 10 includes a main control module 11 and an angle collection module 12. The servo 20 includes a rotation output shaft connected with an external assembly.

The main control module 11 includes an angle information receiving terminal 1 and a detection control terminal 2. The angle collection module 12 includes a magnet 121 and a magnetic encoding chip 122. The magnet 121 is connected to a rotation shaft of the servo 20 and is arranged at an end of the rotation shaft of the servo 20, and spaced apart from the magnetic encoding chip 122 by a certain distance so as to sense the magnetic field generated by the magnet 121. The magnetic encoding chip 122 includes angle information output terminal MOSI and a detection control receiving terminal CS. The angle information output terminal MOSI is connected to the angle information receiving terminal 1 of the main control terminal 11, and the detection control receiving terminal CS is connected to the detection control terminal 2 of the main control terminal 11.

When rotating, the rotation output shaft of the servo 20 drives the magnet 121 to rotate. The main control module 11 controls, via the detection control terminal 2 and the detection control receiving terminal CS, the magnetic encoding chip 122 to sense information of changing magnetic field generated when the magnet 121 rotates. The magnetic encoding chip 122 senses information of rotation angle of the rotation output shaft of the servo 20 according to the information of changing magnetic field. The main control module 11 receives, via the angle information output terminal MOSI and the angle information receiving terminal 1, the information of rotation angle of the rotation output shaft, and controls rotation of the servo 20 according to the information of angle.

In an embodiment of the present invention, the main control module 11 further includes an angle information feedback terminal 3. The magnetic encoding chip 122 includes a feedback receiving terminal MISO coupled to the angle information feedback terminal 3. The main control module 11 outputs, via the angle information feedback terminal 3 and the feedback receiving terminal MISO, angle feedback information to the magnetic encoding chip 122, and determines whether or not the information of rotation angle of the servo 20 is within a preset range. If the information of angle is not within the preset range, the main control module 11 controls the magnetic encoding chip 122 to acquire again the information of rotation angle of the servo 20 according to the information of changing magnetic field.

In an embodiment of the present invention, when the rotation of the rotation output shaft of the servo 20 drives the magnet 121 to rotate any degree, it will cause the change of information of magnetic field. The magnetic encoding chip 122 senses information of rotation angle of the rotation output shaft of the servo 20 according to the information of changing magnetic field. In this way, it can acquire the information of angle of the servo 20 accurately. The main control module 11 can then accurately control the rotation of the electric motor in the servo 20 according to the information of angle of the servo 20.

Figure 2:
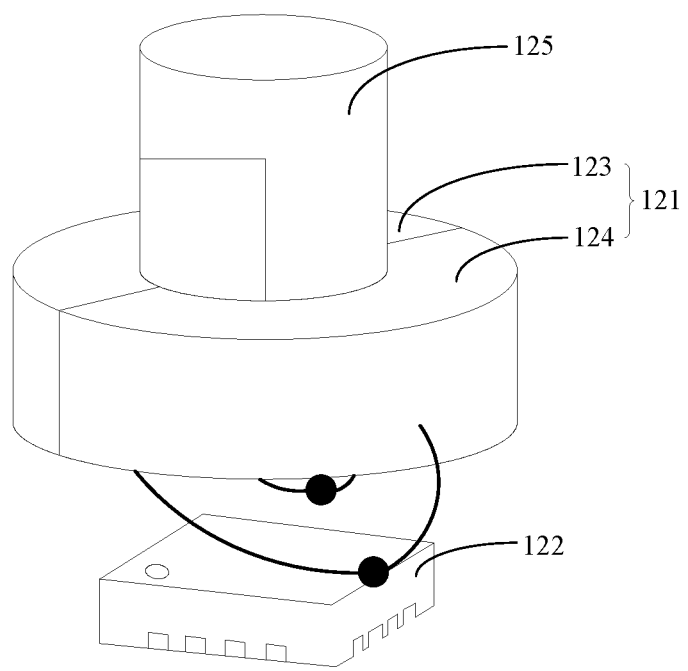
FIG. 2 is a structural schematic diagram of an angle collection module of FIG. 1.
Figure 3:
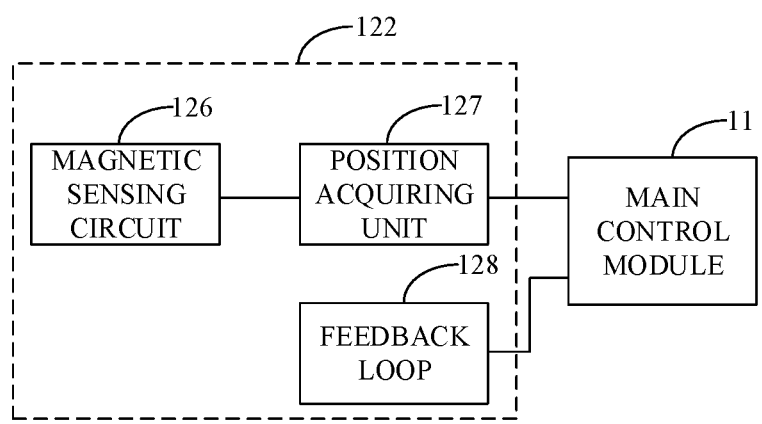
FIG. 3 is schematic block diagram of a magnetic encoding chip of FIG. 1.

In an embodiment of the present invention, referring to FIGS. 2 and 3, the magnet 121 can be a ring shaped magnet, and is comprised of two semicircle N type first magnet 123 and S type second magnet 124. The central position of the ring shaped magnet 121 is provided with a rotation shaft 125, and the rotation shaft 125 is the rotation output shaft of the servo 20. When rotating, the electric motor of the servo 20 drives the rotation shaft 125 to rotate, which then causes the ring shaped magnet 121 to rotate and generates change of magnetic field. The magnetic encoding chip 122 includes a magnetic sensing circuit 126 and a position acquiring unit 127. The magnetic sensing circuit 126 is arranged in the induced magnetic field of the magnet 121 and electrically coupled to the position acquiring unit 127. The position acquiring unit 127 is respectively electrically coupled to, via the angle information output terminal MOSI and the detection control receiving terminal CS, the angle information receiving terminal 1 and the detection control terminal 2 of the main control module 11. When rotating, the servo 20 drives the magnet 121 to rotate through the rotation shaft 125. The magnetic sensing circuit 126 senses the information of changing magnetic field generated when the magnet 121 rotates. The position acquiring unit 12 senses information of rotation angle of the rotation output shaft of the servo 20 according to the information of changing magnetic field, and transmits the information of angle to the main control module 11. The main control module 11 receives the information of angle via the angle information receiving terminal 1, and controls rotation of the servo 20 according to the information of angle.

Referring to FIG. 3, the magnetic encoding chip 122 further includes a feedback loop 128 used to receive, via the feedback receiving terminal MISO and angle information feedback terminal 3, confirmation information feedbacked by the main control module 11, and determine whether or not the information of rotation angle of the rotation output shaft of the servo 20 is within a preset range.

Figure 4:
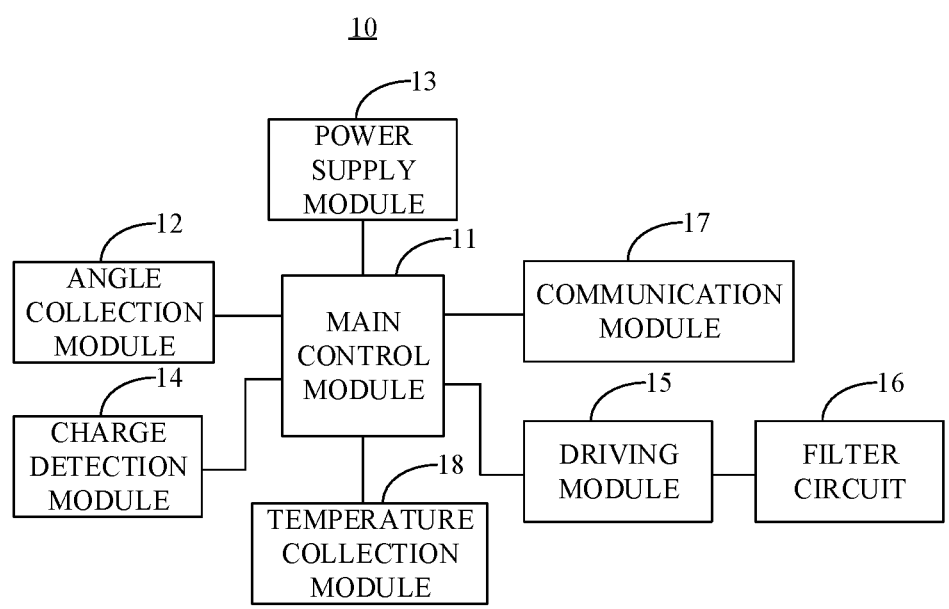
FIG. 4 is a schematic block diagram of a servo control system of a preferred embodiment of the present invention.

In an embodiment of the present invention, referring to FIG. 4, the servo control system 10 further includes a power supply module 13 and a charge detection module 14 respectively coupled to the main control module 11. The charge detection module 14 is used to detect a charge of a battery inside the servo 20 and transmit it to the main control module 11. The main control module 11 controls the rotation of the electric motor in the servo 20 according to the charge of the battery. The power supply module 13 is used to provide a power supply for the servo 20. In an embodiment of the present invention, preferably, the power supply module 13 can provide power supply voltages of 5V and 3.3V for the servo 20.

Figure 5:
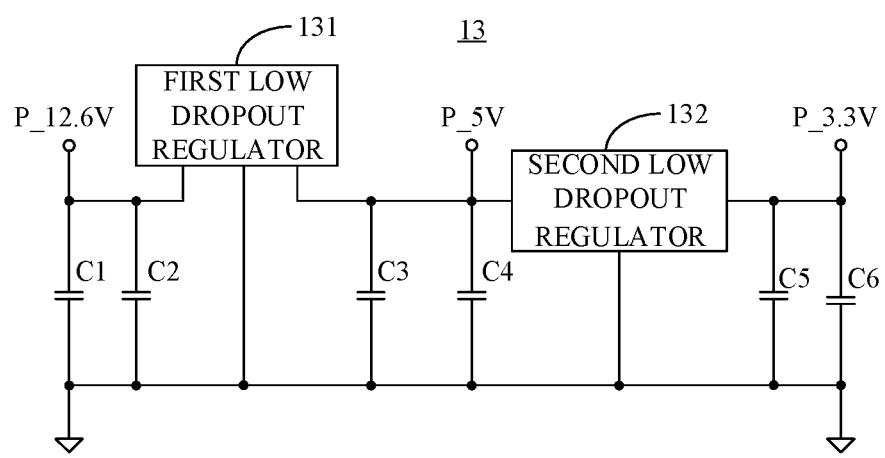
FIG. 5 is a schematic circuit diagram of a power supply module of FIG. 4.

As shown in FIG. 5, the power supply module 13 includes a first low dropout regulator 131, a first capacitor C1, a second capacitor C2, a third capacitor C3, a fourth capacitor C4, a filth capacitor C5, a sixth capacitor C6, and a second low dropout regulator 132. The first capacitor C1 and the second capacitor C2 are connected to each other in parallel between a first voltage terminal P_12.6V and the ground. Wherein, the first voltage terminal P_12.6V provides a reference power supply voltage of 12.6V. The reference power supply voltage of 12.6V is converted into a first power supply voltage of 5V through the first low dropout regulator 131. The third capacitor C3 and the fourth capacitor C4 are connected to each other in parallel between a second voltage terminal P_5V and the ground. The first power supply voltage of 5V is converted into a second power supply voltage of 33V through the second low dropout regulator 132. The fifth capacitor C5 and the sixth capacitor C6 are connected to each other in parallel between a third voltage terminal P_3.3V and the ground. Wherein, the second voltage terminal P_5V outputs a second power supply voltage of 5V, and the third voltage terminal P_3.3V outputs a second power supply voltage of 3.3V. The power supply module 13 realizes, via the first low dropout regulator 131 and the second low dropout regulator 132, the first power supply voltage of 5V and the second power supply voltage of 3.3V, thereby providing reliable power supply voltage for the current level servo 20.

In an embodiment of the present invention, referring to FIG. 4, the servo control system 10 further includes a driving module 15 and at least one filter circuit 16. The driving module 15 is coupled to the main control module 11. The filter circuit 16 is coupled between the driving module 15 and the electric motor. The driving module 15 is used to receive a control signal transmitted from the main control module 11 and output a driving pulse signal according to the control signal to drive the electric motor arranged in the servo 20 to rotate. Wherein, the control signal includes an angle control signal, a speed control signal and an enabling signal. Specifically, according to the angle control signal, the speed control signal and the enabling signal, the driving module 15 outputs two driving pulse signals that are respectively transmitted to two ends of the electric motor. The filter circuit 17 is used to perform a filtering process to the driving pulse signals. Wherein, the angle control signal is acquired by the main control module 11 according to the information of angle transmitted by the magnetic encoding chip 122. The driving module 15 is further used to detect a current operating current of the electric motor and feedback the current operating current of the electric motor to the main control module 11. The main control module 11 adjusts a waveform of the driving pulse signal according to the current operating current of the electric motor.

Figure 6:
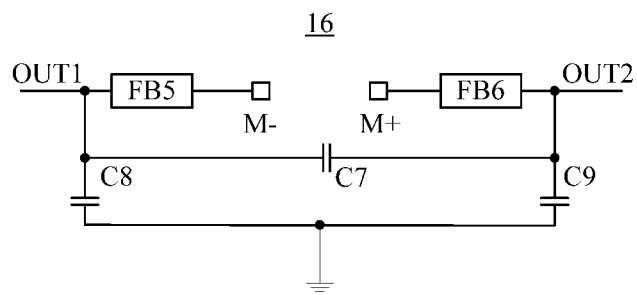
FIG. 6 is a schematic circuit diagram of a filter module of FIG. 4.

Please refer to FIG. 6 for the filter circuit 16. The driving module 15 outputs two driving pulse signals OUT1 and OUT2. The driving pulse signal OUT1 is coupled to an M− terminal of the electric motor via a fuse FB5. The driving pulse signal OUT2 is coupled to an M+ terminal of the electric motor via a fuse FB6. A seventh capacitor C7 is connected in parallel to two ends of the electric motor. The driving pulse signal OUT1 is further grounded via an eighth capacitor C8. The driving pulse signal OUT2 is further grounded via a ninth capacitor C9.

In an embodiment of the present invention, referring to FIG. 4, the servo control system 10 further includes a communication module 17 coupled to the main control module 11. The communication module 17 is used to communicate with a servo of upper level and/or a servo of lower level, receives an identification number, or an identification number together with an action instruction information of the servo of upper level, or transmit an identification number, or an identification number together with an action instruction information of the servo of lower level. Specifically, when the servo 20 is being initialized, the main control module 11 receives, via the communication module 17, identification number assigned to the servo 20 of current level by a servo of upper level, simultaneously receives action instruction information, and transmit them to the main control module 11; and transmits corresponding identification number assigned to a servo of lower level, and simultaneously transmits action instruction information, which can accomplish that the identification numbers are assigned in turn during the initializing process of all the servos, avoiding the installing inconvenience caused by that identification numbers are fixed.

When the servo 20 operates normally, the main control module 11 conducts a semi-duplex communication with the servo of upper level and/or the servo of lower level, to transmit corresponding identification number(s) and action instruction information. In other embodiments of the present invention, it may transmit only the action instruction information, and corresponding identification number(s) is carried in the action instruction information.

Figure 7:
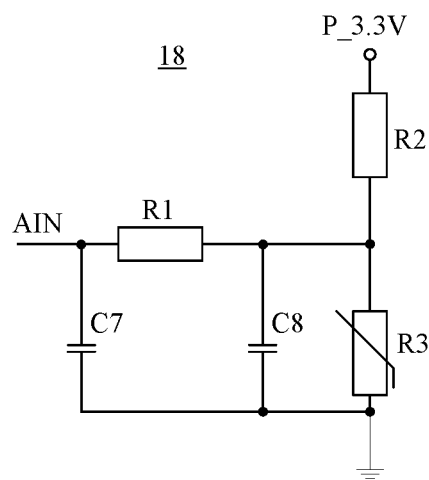
FIG. 7 is a schematic circuit diagram of a temperature collection module of FIG. 4.

Referring further to FIG. 4, the servo control system 10 further includes a temperature collection module 18 coupled to the main control module 11 and used to collect a temperature of the electric motor. If the collected temperature of the electric motor is greater than a preset threshold value, the main control module 11 controls the electric motor to stop rotating, or reduces a rotation speed of the electric motor. Wherein, the preset threshold value can be set according to need and is not limited herein. Referring to FIG. 7, the temperature collection module 18 includes a first resistor R1, a second resistor R2, a third resistor R3, the seventh capacitor C7 and the eighth capacitor C8. The first end of the third resistor R3 is grounded, and the second end is coupled to an output terminal AIN via the first resistor R1. The second end of the third resistor R3 is further coupled to the third voltage terminal P3.3V via the second resistor R2. The output terminal AIN is coupled to the main control module 11. The seventh capacitor C7 is connected in parallel between the output terminal AIN and ground. The eighth, capacitor C8 is connected in parallel to the two ends of the third resistor R3. The third resistor R3 is a temperature detection resistor, its resistance changes along with temperature, divides voltage with the second resistor R2, and outputs it to the main control module 11 via the first resistor R1.

Figure 8:
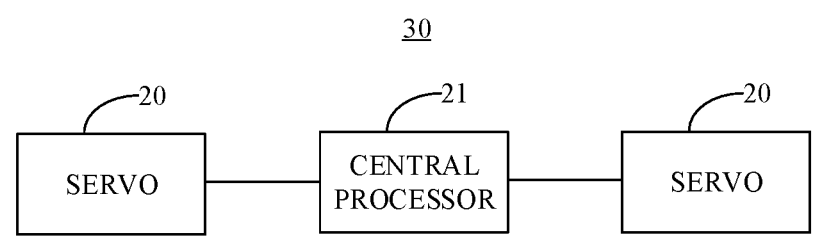
FIG. 8 is a schematic block diagram of a robot of an embodiment of the present invention.

The present invention further provides a robot. As shown in FIG. 8, the robot 30 includes a central processor 21 and a plurality of servos 20 coupled to the central processor 21. The plurality of servos 20 are arranged at different positions of the robot, and all electrically coupled to the central processor 21. Each servo 20 includes a servo control system 10, that is, includes all the elements of the servo control system 10 described hereinbefore and corresponding connection relationships, which are not repeated herein.

In summary, in the servo control system of the present invention, when rotating, the servo drives the magnet to rotate. The main control module controls, via the detection control terminal and the detection control receiving terminal, the magnetic encoding chip to sense information of changing magnetic field generated when the magnet rotates. The magnetic encoding chip senses information of rotation angle of the rotation output shaft of the servo according to the information of changing magnetic field. The main control module receives, via the angle information output terminal and the angle information receiving terminal, the information of rotation angle of the rotation output shaft, and controls rotation of the servo according to the information of angle, which can accurately acquire position information of a servo.

The foregoing descriptions are merely embodiments of the present invention, and the protection scope of the present invention is not limited thereto. All equivalent structural or process changes made according to the content of this specification and accompanying drawings in the present invention, or by directly or indirectly applying the present invention in other relevant technical fields, shall fall within the protection scope of the present invention.

What is claimed is:

1. A servo control system, applied to a servo, wherein the servo control system comprises:
 a main control module, comprising an angle information receiving terminal and a detection control terminal;
 an angle collection module, comprising a magnet and a magnetic encoding chip spaced apart from the magnet by a certain distance, the magnet being connected to a rotation output shaft of the servo, the magnetic encoding chip comprising an angle information output terminal and a detection control receiving terminal, the angle information output terminal being coupled to the angle information receiving terminal of the main control module, and the detection control receiving terminal being coupled to the detection control terminal of the main control module; wherein:
 when rotating, the rotation output shaft drives the magnet to rotate, the main control module controls, via the detection control terminal and the detection control receiving terminal, the magnetic encoding chip to sense information of changing magnetic field generated when the magnet rotates, the magnetic encoding chip senses information of rotation angle of the rotation output shaft of the servo according to the information of changing magnetic field, and the main control module receives, via the angle information output terminal and the angle information receiving terminal, the information of rotation angle of the rotation output shaft, and controls rotation of the servo according to the information of angle;

wherein the magnet is arranged at an end of the rotation output shaft of the servo and comprises of one N type first magnet and one S type second magnet, and a plane of the magnet is substantially parallel to a plane of the magnetic encoding chip;

wherein the servo control system further comprises a power supply module and a charge detection module coupled to the main control module, the power supply module is configured to provide a power supply for the servo, and the charge detection module is configured to detect a charge of a battery inside the servo;

wherein the power supply module comprises a first low dropout regulator, a first capacitor, a second capacitor, a third capacitor, a fourth capacitor, a fifth capacitor, a sixth capacitor, and a second low dropout regulator;

the first capacitor and the second capacitor are connected to each other in parallel between a first voltage terminal and a ground, and the first voltage terminal provides a reference power supply voltage converted into a first power supply voltage through the first low dropout regulator;

the third capacitor and the fourth capacitor are connected to each other in parallel between a second voltage terminal and a ground, the first power supply voltage is converted into a second power supply voltage through the second low dropout regulator;

the fifth capacitor and the sixth capacitor are connected to each other in parallel between a third voltage terminal and a ground, the second voltage terminal outputs a second power supply voltage, and the third voltage terminal outputs a second power supply voltage.

2. The servo control system according to claim 1, wherein the main control module further comprises an angle information feedback terminal, the magnetic encoding chip comprises a feedback receiving terminal coupled to the angle information feedback terminal, the main control module outputs, via the angle information feedback terminal and the feedback receiving terminal, angle feedback information to the magnetic encoding chip, and determines whether or not the information of angle is within a preset range.

3. The servo control system according to claim 1, wherein the magnetic encoding chip comprises a magnetic sensing circuit and a position acquiring unit, the magnetic sensing circuit is arranged in induced magnetic field of the magnet and electrically coupled to the position acquiring unit, and the position acquiring unit is respectively electrically coupled to, via the angle information output terminal and detection control receiving terminal, the angle information receiving terminal and the detection control terminal.

4. The servo control system according to claim 1, wherein the servo control system further comprises a driving module configured to receive a control signal transmitted from the main control module and output a driving pulse signal according to the control signal to drive an electric motor arranged in the servo to rotate.

5. The servo control system according to claim 4, wherein the servo control system further comprises a filter circuit, the filter circuit is coupled between the driving module and the electric motor, and configured to perform a filtering process to the driving pulse signal.

6. The servo control system according to claim 4, wherein the driving module is further configured to detect a current operating current of the electric motor and feedback the current operating current of the electric motor to the main control module, and the main control module adjusts a waveform of the driving pulse signal according to the current operating current of the electric motor.

7. The servo control system according to claim 1, wherein the servo control system further comprises a communication module coupled to the main control module, the communication module is configured to communicate with a servo of upper level and/or a servo of lower level, receives an identification number, or an identification number together with an action instruction information of the servo of upper level, or transmit an identification number, or an identification number together with an action instruction information of the servo of lower level.

8. The servo control system according to claim 1, wherein the servo control system further comprises a temperature collection module coupled to the main control module, the temperature collection module is configured to collect a temperature of the electric motor, if the collected temperature of the electric motor is greater than a preset threshold value, the main control module controls the electric motor to stop rotating, or reduces a rotation speed of the electric motor.

9. The servo control system according to claim 1, wherein the magnet is a ring shaped magnet, and central position of the magnet is arranged at the rotation output shaft of the servo;

the N type first magnet and the S type second magnet are semicircular, and are arranged on the same plane;

the same plane is substantially perpendicular to a plane of the rotation output shaft of the servo, and is facing and substantially parallel to the plane of the magnetic encoding chip.

10. A robot, comprising a central processor and a plurality of servos coupled to the central processor, wherein each servo comprises a servo control system, the servo control system comprises:

a main control module, comprising an angle information receiving terminal and a detection control terminal;

an angle collection module, comprising a magnet and a magnetic encoding chip spaced apart from the magnet by a certain distance, the magnet being connected to a rotation output shaft of the servo, the magnetic encoding chip comprising an angle information output terminal and a detection control receiving terminal, the angle information output terminal being coupled to the angle information receiving terminal of the main control module, and the detection control receiving terminal being coupled to the detection control terminal of the main control module; wherein:

when rotating, the rotation output shaft drives the magnet to rotate, the main control module controls, via the detection control terminal and the detection control receiving terminal, the magnetic encoding chip to sense information of changing magnetic field generated when the magnet rotates, the magnetic encoding chip senses information of rotation angle of the rotation output shaft of the servo according to the information of changing magnetic field, and the main control module receives, via the angle information output terminal and the angle information receiving terminal, the information of rotation angle of the rotation output shaft, and controls rotation of the servo according to the information of angle;

wherein the magnet is arranged at an end of the rotation output shaft of the servo and comprises of one N type first magnet and one S type second magnet, and a plane of the magnet is substantially parallel to a plane of the magnetic encoding chip;

wherein the servo control system further comprises a power supply module and a charge detection module coupled to the main control module, the power supply module is configured to provide a power supply for the servo, and the charge detection module is configured to detect a charge of a battery inside the servo;

wherein the power supply module comprises a first low dropout regulator, a first capacitor, a second capacitor, a third capacitor, a fourth capacitor, a fifth capacitor, a sixth capacitor, and a second low dropout regulator;

the first capacitor and the second capacitor are connected to each other in parallel between a first voltage terminal and a ground, and the first voltage terminal provides a reference power supply voltage converted into a first power supply voltage through the first low dropout regulator;

the third capacitor and the fourth capacitor are connected to each other in parallel between a second voltage terminal and a ground, the first power supply voltage is converted into a second power supply voltage through the second low dropout regulator;

the fifth capacitor and the sixth capacitor are connected to each other in parallel between a third voltage terminal and a ground, the second voltage terminal outputs a second power supply voltage, and the third voltage terminal outputs a second power supply voltage.

11. The robot according to claim 10, wherein the main control module further comprises an angle information feedback terminal, the magnetic encoding chip comprises a feedback receiving terminal coupled to the angle information feedback terminal, the main control module outputs, via the angle information feedback terminal and the feedback receiving terminal, angle feedback information to the magnetic encoding chip, and determines whether or not the information of angle is within a preset range.

12. The robot according to claim 10, wherein the magnetic encoding chip comprises a magnetic sensing circuit and a position acquiring unit, the magnetic sensing circuit is arranged in induced magnetic field of the magnet and electrically coupled to the position acquiring unit, and the position acquiring unit is respectively electrically coupled to, via the angle information output terminal and the detection control receiving terminal, the angle information receiving terminal and the detection control terminal.

13. The robot according to claim 10, wherein the servo control system further comprises a driving module configured to receiving a control signal transmitted from the main control module and output a driving pulse signal according to the control signal to drive an electric motor arranged in the servo to rotate.

14. The robot according to claim 13, wherein the servo control system further comprises a filter circuit, the filter circuit is coupled between the driving module and the electric motor, and configured to perform a filtering process to the driving pulse signal.

15. The robot according to claim 13, wherein the driving module is further configured to detect a current operating current of the electric motor and feedback the current operating current of the electric motor to the main control module, and the main control module adjusts a waveform of the driving pulse signal according to the current operating current of the electric motor.

16. The robot according to claim 10, wherein the servo control system further comprises a communication module coupled to the main control module, the communication module is configured to communicate with a servo of upper level and/or a servo of lower level, receives an identification number, or an identification number together with an action instruction of the servo of upper level, or transmit an identification number, or an identification number together with an action instruction of the servo of lower level.

17. The robot according to claim 10, wherein the servo control system further comprises a temperature collection module coupled to the main control module, the temperature collection module is configured to collect a temperature of the electric motor, if the collected temperature of the electric motor is greater than a preset threshold value, the main control module controls the electric motor to stop rotating, or reduces a rotation speed of the electric motor.

* * * * *